United States Patent
Janzon et al.

[15] 3,691,089
[45] Sept. 12, 1972

[54] PROCESS FOR THE PRODUCTION OF COLLOIDAL SILICIC ACID COATED WITH MIXTURE OF METALLIC OXIDES, AND PRODUCT

[72] Inventors: Karl-Heinz Janzon, Grossauheim; Eugen Meyer Simon; Heinrich Schwab, both of Frankfurt/Main, all of Germany

[73] Assignee: Deutsche Gold-und Silber-Scheidean Stalt, Vormals Roessler, Frankfurt am Main, Germany

[22] Filed: Aug. 5, 1970

[21] Appl. No.: 61,484

[30] Foreign Application Priority Data

Aug. 8, 1969 Germany..........P 19 40 412.7

[52] U.S. Cl. ............252/313 S, 106/286, 117/100 S, 252/317
[51] Int. Cl...........................B01j 13/00, B44d 1/12
[58] Field of Search......252/313 S, 313 R; 117/100 S

[56] References Cited

UNITED STATES PATENTS

| | | |
|---|---|---|
| 2,928,754 | 3/1960 | Schappel............252/313 S X |
| 3,082,099 | 3/1963 | Beasley et al.......252/313 S X |
| 3,007,878 | 11/1961 | Alexander et al. .....252/313 S |
| 3,069,277 | 12/1962 | Teja....................252/313 S X |
| 3,139,406 | 6/1964 | Mindick et al..........252/313 S |

Primary Examiner—Richard D. Lovering
Attorney—Michael S. Striker

[57] ABSTRACT

Silicic acid sols are treated with a mixture of trivalent metal salts and bivalent metal salts which react to form metallic oxide coatings on the surface of the sol particles. The sols as a result are rendered more stable, as indicated by the fact that the viscosity of said sols remains constant and the tendency to gel is eliminated. The sols can be dried to give a finely divided product.

10 Claims, No Drawings

PROCESS FOR THE PRODUCTION OF COLLOIDAL SILICIC ACID COATED WITH MIXTURE OF METALLIC OXIDES, AND PRODUCT

BACKGROUND OF THE INVENTION

Aqueous metal oxide sols have long been known (see for example H. Weiser, "The Hydrous Oxides," 1926); however, these sols as a result of the fact that they can exist only in extremely dilute solutions have acquired no economic importance.

In U.S. Pat. Nos. 2,438,230 and 2,560,707 processes are described for forming metal oxide sols of 6-10 percent oxides However, at these low concentrations the viscosity of the sols is too low for any useful application. As a result research has been carried out to attempt to modify the silicic acid sols with metal oxides to achieve a product which has the properties of the metal oxide sols.

According to U.S. Pat Nos. 3,139,406 the sol of an oxide of the trivalent metals iron, chromium or aluminum can be prepared if the acid salts of one of these trivalent metals is mixed with a silicic acid sol and then is brought in repeated contact with a basic ion exchanger. Since, after the contact with the ion exchanger, where only a portion of the anions of the metal salt are exchanged for hydroxyl ions, the ion exchanger must be removed and the mixture must be heated; this constitutes a process that is very expensive.

U.S. Pat. No. 3,252,917 describes a process for the preparation of a silicic acid sol coated with $Al_2O_3$. In this process silicic acid is freed of electrolyte by repeated contact with an ion exchanger. The silicic acid sol is then mixed with a water solution of a basic aluminum salt, the mixture is then heated to harden the oxide coating and finally the mixture is treated with a basic ion exchanger. The product has the disadvantage that the viscosity of the solution prepared in this way increases during storage.

As is evident from the amount of work, there is an urgent need for a process for the preparation of a metal oxide coated silicic acid sol which can be formulated to have the properties required and can be formulated in high concentrations.

SUMMARY OF THE INVENTION

It is an object of the present invention to prepare stable silicic acid sols. It is a further object of the present invention to prepare silicic acid sols stabilized by coating with a mixture of metallic oxides. It is still another object of the present invention to develop a method of preparing such stable silicic acid sols with properties which may be varied to suit the requirements. It is yet another object to develop a method of preparing stable silicic acid sols which is economical.

The invention consists in the addition to a silicic acid sol of one or more salts containing a trivalent metal and one or more salts containing a divalent metal. The metals may be in form of a complex, either as individual complexes or as mixed complexes. As a result of adding the metal salts to the silicic acid sol, the particles of the sol are coated with a layer of metal oxide. As a final step the sol can be fixed or the solution can be dried or concentrated.

DESCRIPTION OF THE PREFERRED EMBODIMENTS

A preferred starting material is a silicic acid sol with a content of 15-40 wt. percent of silicic acid, a pH value of 3.5-6.5 and, preferably, 3.8-4.8 and a specific surface area of 50-500 $m^2/g$, and preferably 60-250 $m^2/g$. The salt-free silicic acid sol is then mixed with solutions of the trivalent salts of aluminum or iron or chromium in a mixture with solutions of salts of one or more divalent metals such as Mg, Ca, Sr, Ba, Fe, Co, Ni, Mn, Cu, Zn and Cd.

By mixing of the above solutions, it is possible to achieve a silicic acid sol in which the particles are covered with coatings of metallic oxides of tri- and divalent metals. If necessary, the product can be heated or dried. It is possible to dry the product until a fine powder is achieved. For drying, spray-drying or drying under super-critical conditions may be utilized. The product is an alkali-stable silicic acid sol with a surface area between 50 and 500 $m^2/g$, and preferably between 60 and 250 $m^2/g$. The alkali-stabilized silicic acid sol is rendered salt-free by contact with an ion-exchange system consisting of an acid and a basic ion exchanger in a thoroughly electrolyte-free state, by means of which the pH value of the sol is brought to between 3.5 and 6.5 and preferably between 3.8 and 4.8

A number of processes are available for removing the salt from the alkali-stabilized silicic acid sol. The alkali-stabilized sol can be brought in contact first with a strongly acid cation exchanger in the H-form and then with an anion exchanger or in reverse order, or simultaneously with a mixed ion exchanger. In this process the anion exchanger can be, for example, in a strongly basic or a medium-strong basic to a weakly basic condition in the OH-form. The ion exchanger can be partly loaded with hydroxyl ions and partly with the anions of a weak acid.

A suitable starting material in accordance with the process of the invention herein disclosed is an available silicic acid sol where the silicic acid is in the form of small spherical particles with a surface area of 250 $m^2/g$. This sol can be characterized by the representative properties in the following Table 1. 1.

TABLE 1

| Silicic acid sol | I | II | III | IV |
|---|---|---|---|---|
| $SiO_2$ (wt. %) | 15 | 30 | 40 | 15 |
| pH | 9.5 | 9.1 | 9.6 | 9.4 |
| rel. viscosity (against water) | 1.05 | 1.12 | 1.08 | 1.02 |
| density (g/cm³) | 1.1 | 1.2 | 1.29 | 1.09 |
| surface area (m²/g) | 239 | 229 | 65 | 140 |
| particle diameter (mµ) | 4-9 | 5-12 | 35-55 | 15-25 |
| $Na_2O$ (wt. %) | 0.15 | 0.23 | 0.12 | 0.08 |
| transparency | clear | clear | turbid | opalescent |

The surface coating produced on the silicic acid particles by the process of the present invention probably consists of a mixed oxide resulting from the hydrolysis of one or more trivalent metals such as Al, Fe and Cr and one or more divalent metals such as Mg, Ca, Sr, Ba, Fe, Co, Ni, Mn, Cu, Zn and Cd.

The sols produced according to the process of the present invention are of high concentration and high stability in contrast with the properties of metal oxide sols of relatively low concentration prepared by other processes.

According to a particularly advantageous variation of the present invention, the trivalent metal may be introduced as a complex with the formula $[Me_2(OH)_5A]_x \cdot n\ H_2O$, wherein $x$ is equal to or less than 5 and $n$ is equal to or greater than zero, Me is a trivalent metal and A is the anion of an acid such as $Cl^{116}$, $1/2\ SO_4^-$, $NO_3^-$, together with solutions of a salt of one or more divalent metals as listed above. The divalent metals can also be in the form of an acetate.

A further possibility within the scope of the present invention is to use mixed basic complexes of both divalent and trivalent ions. The following is a representative formula $[Me_a^{II} Me_b^{III} (OH)_m A_n] \cdot w$, in which the ratio $a/b$ lies between 0.03 and 0.5 and the ratio $b/n$ lies between 0.25 and 1.0, and m equals $2a + 3b - n$. The metallic salt or complex salt solutions should be used in a concentration such as to give a metal oxide content lying between 2 and 30 percent, and preferably between 2 and 25 percent Especially good products are obtained when the metal oxide coated silicic acid sol has a mole ratio of $Me_2O_3 : SiO_2$ between 0.02 and 0.5 and of $MeO : Me_2O_3$ between 0.05 and 1, preferably between 0.05 and 0.75, and the pH-value lies between 3.8 and 5, and the $SiO_2$ content lies between 5 and 25 percent.

The total content of the metallic oxide portion in accordance with the findings of the present invention lies between a very dilute sol and 35 percent concentration. The solution can be varied between these concentration limits by the addition or removal of water in arbitrary amounts without impairing the stability of the sol.

To fix the mixed oxide coating on the surface of the silicic acid sol it is desirable to heat the mixture of the metal salt solution and the salt-free silicic acid sol. According to the process the silicic acid sol is fed to the metal oxide solution and, at the end of the addition, the mixture is heated for a period of 10–30 minutes at a temperature between 30° C. and 100° C. A more specific example is to heat the mixture to 80° C. and to keep it for an arbitrary time at this temperature, preferably between 30 and 150 minutes. The fixing or hardening can be coupled with a step of increasing the concentration in which the mixture is heated in a revolving vaporizer at 1 atm. or at reduced pressure at the boiling point to remove the desired quantity of water.

In summary, this invention comprises the products prepared from silicic acid sols and metal oxides, namely metal oxide coated silicic acid sols consisting of a layer of oxide of di- and trivalent metals coated on spherical silicic acid granules of 3–60 m$\mu$ diameter, whereby the properties of the sol are substantially modified as a result of the coating with the oxide layer thereon.

The metal oxide coated sols prepared according to the present invention can also be dried to a gel which can be used in many fields of the chemical industry* (*The sols can be spraydried or dried by exposure to supercritical conditions to give a finely divided gel. Of course ordinary drying is also possible.) In the textile industry the metal oxide sols, and in particular the cation-active sols, can be added to cation-active systems which are used as spinner aids for the purpose of smoothing and impregnating the fibers in order to strengthen the fabric, and especially for increasing the non-slip properties of the material. Also, they can be used as catalysts in the petrochemical industry. Further, the metal oxide coated sols can be used for the preparation of pigments, overlays and glazes for the metals and ceramics industries. Finally, they are also useful in the paper industry and for the preparation of floor waxes.

The following examples show how the salt-free silicic acid sols are used according to the present process.

A cation exchanger made from divinylbenzene cross-linked polystyrene carrying sulfonic acid groups as the active group is converted to the H-form by means of 10% HCl, and then is washed neutral with de-ionized water. A column is then filled with the ion exchanger and the ion exchanger remains in the column during the ion-exchange process and the subsequent regeneration and washing. A second column is filled with a cross-linked aliphatic polyamine resin which is an anion exchanger and as active groups holds primary, secondary and tertiary amines. The ion exchanger is treated with 4 percent sodium acetate or 4 percent sodium hydroxide and the excess of the treatment material is washed out with de-ionized water.

The alkali-stabilized starting material (the silicic acid sol) is first put through the cation exchanger and then through the anion exchanger. The flow rate through the column amounts to about 50% of the computed maximum of the specific loading of the ion-exchange columns. After displacement of the sols from the columns by treatment with de-ionized water, the columns are washed with electrolyte-free water to prevent silification of the contents of the columns.

EXAMPLE 1

(Comparison Example)

In this example it is shown how the stability of the aluminum oxide coated silicic acid sol can be influenced by the addition of a relatively small quantity of a divalent metal.

2 liters of a silicic acid sol (Table 1, type 1) are deionized and therefrom an aluminum oxide coated sol (sol A) and an $Al_2O_3/MgO$-coated sol (sol B) are prepared.

Sol A 1000 ml of a de-ionized silicic acid sol (13.5 percent $SiO_2$, pH = 4.0) are mixed with a solution of 70 g of basic aluminum chloride (21.75% Al, 16.03% Cl) in 400 ml of deionized water. Using stirring, the solution is heated up to 80° C. over a period of 15 minutes and held at this temperature for 1 hour. Then, under partial vacuum, 500 ml of water are distilled off at 80° C. The sol A has the following composition (in this and all subsequent tables of composition, compositions will be given in wt. percent):

| | | | |
|---|---|---|---|
| $SiO_2$ | 12.2% | pH-value | 3.8 |
| $Al_2O_3$ | 3.58% | rel. visc. | 1.04 |
| | | mole ratio: | |
| | | $Al_2O_3/SiO_2$ | 0.174 |

Sol B

For the preparation of Sol B, 1,000 ml of deionized silicic acid sol (composition 13.5% $SiO_2$, pH = 4.0) with a solution of 70 g of basic aluminum chloride (21.57% Al, 16.03% Cl) and 1 g $Mg(CH_3COO)_2 \cdot 4H_2O$ in 400 ml water were mixed together, and the mixture as under Sol A was fixed and concentrated.

Sol B has the following composition:

| | | | |
|---|---|---|---|
| $SiO_2$ | 12.63% | pH | 3.8 |
| $Al_2O_3$ | 3.72% | rel. visc. | 1.04 |
| MgO | 0.12% | mole ratio: | |
| | | $Al_2O_3/SiO_2$ | 0.174 |
| | | $MgO/Al_2O_3$ | 0.082 |

The sols A and B were stored in polyethylene flasks and the viscosity was measured after various periods of standing.

Table 2 shows the dependence of the relative viscosities of sols A and B on the length of storage.

TABLE 2

Relative Viscosity

| Storage period in days | 0 | 7 | 15 | 30 | 50 | 100 |
|---|---|---|---|---|---|---|
| Sol A | 1.04 | 1.05 | 1.16 | 1.27 | 2.1 | + |
| Sol B | 1.04 | 1.04 | 1.04 | 1.04 | 1.04 | 1.04 |

Sol A was found to have gelatinized after about 100 days; Sol B on the other hand after storage of 200 days showed no measurable change in the relative viscosity.

EXAMPLE 2

1,650 g of a mixed basic oxide complex with 42% $Al_2O_3$, 5.95% MgO and 17.5% Cl were mixed with heating and stirring with 8,000 ml of water at room temperature. To this solution were added with stirring 30 kg of deionized silicic acid sol (Type IV, Table 1; 12% $SiO_2$, pH 3.7) which were heated after the ending of the addition to 60° C. and held there for one-half hour. The sol was then transferred to a circulation evaporator and at a pressure of 1 atmosphere the volume was reduced to 20 liters. The product was slightly opalescent and was a stable sol of the following composition:

| | | | |
|---|---|---|---|
| $SiO_2$ | 14.16% | pH | 4.25 |
| $Al_2O_3$ | 2.81% | relative visc. | 1.03 |
| MgO | 0.4% | | |
| Cl | 0.98% | mol ratio: | |
| | | $Al_2O_3/SiO_2$ | 0.117 |
| | | $MgO/Al_2O_3$ | 0.36 |

EXAMPLE 3

46 grams of a basic aluminum chloride (43.5% $Al_2O_3$, 16.15% Cl), 1 g of a basic trivalent chromium chloride (27% $Cr_2O_3$, 13.5% Cl) and 20 g $Mg(CH_3COO)_2 \cdot 4H_2O$ were mixed with 500 ml of a deionized water. To this solution were added 500 ml of deionized silicic acid sol (Typ II, Tab. 1; 19.5% $SiO_2$, pH 3.8) under stirring. A weakly gray-green colored sol of the following properties was obtained:

| | | | |
|---|---|---|---|
| $SiO_2$ | 8.8% | pH | 5.0 |
| $Al_2O_3$ | 3.5% | relative visc. | 1.04 |
| $Cr_2O_3$ | 0.048% | | |
| MgO | 0.62% | mol ratio: | |
| | | $Me_2O_3/SiO_2$ | 0.234 |
| | | $MgO/Me_2O_3$ | 0.448 |

This sol was spray-dried without any prior treatment for hardening or fixing. The product was a weakly gray powder with a surface area of 164 $m^2/g$ and a bulk density of about 300 g/l.

EXAMPLE 4

To 35 grams of a basic aluminum chloride (43.5% $Al_2O_3$, 16.15% $SiO_2$) and 16 grams $Mg(CH_3Coo)_2 \cdot 4 H_2O$ in 300 ml $H_2O$ were dissolved in room temperature 400 ml of a salt free silicic acid sol (type IV, Tab. 1; 15% $SiO_2$, pH 4) drop by drop.

After completing the addition, the mixture was heated during 15 minutes to 75° C. and kept at that temperature for 45 minutes. Finally, the solution was concentrated to about 500 ml.

The opalescent solution had the following composition and properties:

| | | | |
|---|---|---|---|
| $SiO_2$ | 10.0% | pH | 4.2 |
| $Al_2O_3$ | 2.73% | relative visc. | 1.03 |
| MgO | 0.56% | | |
| Cl | 0.99% | mol ratio: | |
| | | $Al_2O_3/SiO_2$ | 0.161 |
| | | $MgO/Al_2O_3$ | 0.52 |

EXAMPLE 5

580 grams of a basic aluminum chloride (43.5% $Al_2O_3$, 16.15% Cl), 50 g $Cu(CH_3COO)_2 \cdot H_2O$ and 50 g $Ni(CH_3COO)_2 \cdot 4 H_2O$ were mixed with 3,000 ml of deionized water.

1,500 ml of a silicic acid sol (Type II, Tab. 1, 31.5% $SiO_2$, pH 9.1) were diluted with 1,200 ml of deionized water and put through the cation exchange column described above. The acid sol was then put through a strongly basic anion exchanger consisting of a cross-linked polystyrene resin carrying quarternary ammonia groups and which had been previously put into the OH-form by treatment with 10% NaOH. The deionized silicic acid sol which had a pH of 6.4 was brought to $pH^4$ by means of acetic acid and then mixed with the solution of the three metal salts given above. The solution was then heated to 80° C. and kept at this temperature for 1 hour. Finally, 500 ml of the strongly colored sol were concentrated at normal temperature to a sol with the following composition and properties:

| | | | |
|---|---|---|---|
| $SiO_2$ | 11.12% | pH | 4.25 |
| $Al_2O_3$ | 7.52% | relative visc. | 1.025 |
| CuO | 0.88 | | |
| NiO | 0.46% | mol ratio: | |
| Cl | 2.7% | $Al_2O_3 : SiO_2$ | 0.4 |
| | | $MeO : Al_2O_3$ | 0.234 |

EXAMPLE 6

100 ml of a solution containing 2.5% Cr and 1.65% Cl were diluted with 300 ml of $H_2O$. In this solution were then dissolved 23.5 g of a basic aluminum chloride (43.5% $Al_2O_3$, 16.15% Cl) and finally 5.5 g $Zn(CH_3COO)_2 \cdot 2H_2O$ were slowly added. At the completion of the addition, the solution was stirred for one-half hour and filtered.

To the filtered solution were added under stirring 300 ml of a deionized silicic acid sol (Type IV, Tab. 1; 14.3% $SiO_2$) which had been brought to a pH of 3.9 by means of acetic acid. The solution was stirred for 15 minutes at room temperature and then heated for fixation to 80° C. Under partial vacuum 200 ml of water were removed. The product was a stable dark green solution with the following composition and properties:

| | | | |
|---|---|---|---|
| $SiO_2$ | 11.27% | pH | 3.9 |
| $Al_2O_3$ | 4.03% | relative visc. | 1.04 |
| $Cr_2O_3$ | 1.21% | | |
| ZnO | 0.75% | Mol ratio: | |
| Cl | 1.17% | $Me_2O_3/SiO_2$ | 0.254 |
| | | $ZnO/Me_2O_3$ | 0.194 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A process for the preparation of a stable, aqueous silicic acid sol comprising the steps of mixing a salt-free aqueous silicic acid sol with solutions of at least one trivalent metal salt and at least one divalent metal salt and heating the mixture to between about 30 and 100°C to form a metal oxide coating on the surface of the silicic acid particles, the metal of said trivalent metal salt being a member selected from the group consisting of Al, Fe and Cr and the metal of said divalent metal salt being a member selected from the group consisting of Mg, Ca, Sr, Ba, Fe, Co, Ni, Mn, Cu, Zn, and Cd and, the amounts of said metal salts being selected so as to give mole ratios of $Me_2O_3$ to $SiO_2$ between about 0.02 and 0.5 and of MeO to $Me_2O_3$ between about 0.05 and 1.

2. The process of claim 1 wherein the silicic acid content of said sol used as starting material is in the range from 15 to 40 percent and the pH of said sol is in the range from 3.5 to 6.5 and said sol has a specific surface area of 50–500 $m^2/g$.

3. The process of claim 2 wherein the pH of said sol is in the range from 3.8 to 4.8 and said sol has a specific surface area of 60–250 $m^2/g$.

4. The process of claim 1 wherein the trivalent metal is in the form of a basic complex of the formula $[Me_2(OH)_5A]_x \cdot nH_2O$ where $x$ is an integer from 1 to 5, $n$ is equal to or greater than zero, Me is said trivalent metal, A is an anion selected from the group consisting of $Cl^-$, $1/2\ SO_4^-$, and $NO_3^-$, and wherein said complex is combined with at least one divalent metal salt of a metal selected from said group consisting of Mg, Ca, Sr, Ba, Fe, Co, Ni, Mn, Cu, Zn and Cd.

5. The process of claim 1, wherein the divalent and trivalent metal salts are in the form of a mixed basic complex having the formula $[Me_a^{II}Me_b^{III}(OH)_mA_n] \cdot w$ where the ratio $a/b$ is between 0.03 and 0.5, the ratio $b/n$ is between 0.25 and 1, and $m$ equals $2a+3b-n$ and $w$ signifies the number of water molecules associated with said complex basic salt.

6. The process of claim 1 wherein the divalent metal salt is an acetate.

7. The process of claim 1 wherein the amounts of salts are selected to provide a mol ratio of MeO to $Me_2O_3$ from 0.05 to 0.75.

8. The process of claim 1 wherein the amounts of starting sol and salts are chosen to provide for a coated silicic acid sol which has a silica content of 5–25 percent.

9. The process of claim 1 including the step of rendering the silicic acid sol used as starting compound salt-free by passing it through an ion exchange system consisting of an acid and a basic ion exchange compound to adjust the pH of the sol to a value between 3.8 and 4.8.

10. A metal-oxide coated silicic acid sol of high stability consisting of spherical silicic acid particles with a diameter of 3–60 m$\mu$ coated with divalent and trivalent metal oxides, the $SiO_2$ content of the sol being between 5 and 25 percent, the metal of said trivalent metal oxide being a member selected from the group consisting of Al, Fe and Cr, the metal of said divalent metal oxide being a member selected from the group consisting of Mg, Ca, Sr, Ba, Fe, Co, Ni, Mn, Cu, Zn and Cd and said metal oxides being present at mole ratios of $Me_2O_3$ to $SiO_2$ between about 0.02 and 0.5 and of MeO to $Me_2O_3$ between about 0.05 and 1.

* * * * *